US 12,506,225 B2

(12) United States Patent
Eheim et al.

(10) Patent No.: US 12,506,225 B2
(45) Date of Patent: Dec. 23, 2025

(54) CONTACT AS MODULE CONNECTOR, CONNECTION ASSEMBLY, BATTERY CELL AND BATTERY MODULE WITH SUCH CONTACT ASSEMBLIES

(71) Applicant: TE Connectivity Germany GmbH, Bensheim (DE)

(72) Inventors: Manuel Eheim, Bensheim (DE);
Alexander Weber, Bensheim (DE);
Bjoern Hoffmann, Bensheim (DE);
Frank Kaehny, Bensheim (DE);
Patrick Distler, Bensheim (DE);
Marcus Wolf, Bensheim (DE)

(73) Assignee: TE Connectivity Germany, Bensheim (DE)

( * ) Notice: Subject to any disclaimer, the term of this patent is extended or adjusted under 35 U.S.C. 154(b) by 738 days.

(21) Appl. No.: 17/826,649

(22) Filed: May 27, 2022

(65) Prior Publication Data
US 2022/0384911 A1 Dec. 1, 2022

(30) Foreign Application Priority Data
May 27, 2021 (DE) .......................... 102021113768.3

(51) Int. Cl.
*H01M 50/503* (2021.01)
*H01M 50/296* (2021.01)
(Continued)

(52) U.S. Cl.
CPC ....... *H01M 50/503* (2021.01); *H01M 50/502* (2021.01); *H01M 50/505* (2021.01);
(Continued)

(58) Field of Classification Search
CPC ............. H01M 50/505; H01M 50/517; H01M 50/296; H01M 55/503; H01R 4/56; H01R 11/26; H01R 13/622
(Continued)

(56) References Cited

U.S. PATENT DOCUMENTS

| 4,110,904 A | 9/1978 | Johnson |
| 6,354,882 B1 | 3/2002 | Lindqvist et al. |

(Continued)

FOREIGN PATENT DOCUMENTS

| DE | 102013007036 A1 | 10/2014 |
| DE | 102015216543 A1 | 3/2017 |

(Continued)

OTHER PUBLICATIONS

Narayan, R. and Julien B. "Flexible Busbar Solution for High Current Density Applications." 2024 IEEE International Communications Energy Conference (INTELEC). IEEE, 2024. Pag. 4; par. 1-2. (Year: 2024).*

(Continued)

*Primary Examiner* — Nicole M. Buie-Hatcher
*Assistant Examiner* — Gilberto Ramos Rivera
(74) *Attorney, Agent, or Firm* — Barley Snyder

(57) ABSTRACT

A contact assembly includes a contact element having a lead-through opening, a contact section extending in a tube-shaped manner along the lead-through opening and having a contact surface, and a collar section connected to the contact section and extending the lead-through opening in a sleeve-shaped manner, a busbar having a reception opening receiving the collar section, and a fastener inserted into the lead-through opening. The contact element has a first friction surface affixable with the busbar in the reception opening in a frictionally engaging manner and a second friction surface affixable in the reception opening with the (Continued)

busbar or in the lead-through opening with the fastener in a frictionally engaging manner. The first friction surface and the second friction surface are mutually offset in a radial direction with respect to the lead-through opening.

20 Claims, 5 Drawing Sheets

(51) Int. Cl.
  H01M 50/502 (2021.01)
  H01M 50/505 (2021.01)
  H01M 50/517 (2021.01)
  H01R 4/56 (2006.01)
  H01R 4/58 (2006.01)
(52) U.S. Cl.
  CPC ............ *H01M 50/517* (2021.01); *H01R 4/56* (2013.01); *H01R 4/58* (2013.01); *H01M 50/296* (2021.01)
(58) Field of Classification Search
  USPC ........................................................ 429/121
  See application file for complete search history.

(56) References Cited

U.S. PATENT DOCUMENTS

| | | |
|---|---|---|
| 6,491,551 B1 | 12/2002 | Julian et al. |
| 10,205,274 B2 | 2/2019 | Loncar et al. |
| 11,145,995 B2 | 10/2021 | Blumenschein et al. |
| 2012/0223211 A1 | 9/2012 | Mayr et al. |
| 2013/0025121 A1* | 1/2013 | Van Swearingen ......................... H01R 43/0207 29/874 |
| 2014/0216814 A1 | 8/2014 | Suzuki |
| 2018/0287270 A1 | 10/2018 | Blumenschein et al. |
| 2018/0294600 A1 | 10/2018 | Loncar et al. |
| 2018/0375227 A1 | 12/2018 | Kaehny et al. |
| 2019/0207329 A1* | 7/2019 | Kneissl ................... H01R 4/38 |
| 2024/0006782 A1 | 1/2024 | Wilken |

FOREIGN PATENT DOCUMENTS

| | | | |
|---|---|---|---|
| DE | 102017217688 A1 | 4/2019 | |
| DE | 102020130894 A1 | 2/2021 | |
| EP | 3136511 A2 * | 3/2017 | ............ H01R 13/44 |
| JP | H07249882 A1 | 9/1995 | |
| JP | 2018170274 A | 11/2018 | |
| SE | 522773 C2 | 6/1998 | |

OTHER PUBLICATIONS

European Office Action dated Nov. 15, 2024, corresponding to Application No. 22 175 428.6-1201, 8 pages.
Korean Office Action dated Jan. 23, 2024 with English translation, corresponding to Application No. 10-2022-0064719, 15 pages.
Extended European Search Report dated Oct. 18, 2022 corresponding to Application No. 22175428.6-1201, 11 pages.
Chinese Office Action dated May 22, 2025, corresponding to Application No. 202210569699.8, 8 pages.

* cited by examiner

CONTACT AS MODULE CONNECTOR, CONNECTION ASSEMBLY, BATTERY CELL AND BATTERY MODULE WITH SUCH CONTACT ASSEMBLIES

CROSS-REFERENCE TO RELATED APPLICATIONS

This application claims the benefit of the filing date under 35 U.S.C. § 119(a)-(d) of German Patent Application No. 102021113768.3, filed on May 27, 2021.

FIELD OF THE INVENTION

The present invention relates to an electrically conductive contact assembly for a module connection.

BACKGROUND

For the transmission of electrical currents in the order of several hundred amperes between electrical modules, such as e.g. battery modules and electric motors or other electrical consumption units, busbars made of copper, aluminum or alloys containing copper and/or aluminum are often used in automotive and power engineering. In order to be able to connect the electrical modules to each other, the busbars are often provided with contact sections which project from the remaining busbar, provide a defined contact surface, and are pressed together by fastener. In this context, the projecting contact sections represent a discontinuity in the shape of the respective busbar, which often leads to challenges in manufacturing.

If the busbar is manufactured in one piece with the contact section, e.g. by forging or extrusion, the remaining section of the busbar often cannot be configured completely freely but is subject to constructional restrictions, since the entire busbar could otherwise not be manufactured or could only be manufactured at great effort. In other words, busbars manufactured in one piece are limited in their geometry and therefore cannot have complex courses. However, modern battery applications, in the field of electromobility in particular, require busbars with complex profiles, especially since battery modules and electric motors are increasingly distributed in a decentralized manner in the vehicle in order to save installation space.

If the contact sections are instead welded to the busbar during manufacture as previously separate components, restrictions also arise because the aspect of weldability must be superordinate to other properties of the materials and the construction. This may mean that particularly weight-saving materials or material combinations cannot be used because they are not suitable for welding.

Accordingly, the underlying problem of the present invention is to provide modular connections that can be configured more freely in terms of geometry and choice of material and can thus be manufactured more easily.

SUMMARY

A contact assembly includes a contact element having a lead-through opening, a contact section extending in a tube-shaped manner along the lead-through opening and having a contact surface, and a collar section connected to the contact section and extending the lead-through opening in a sleeve-shaped manner, a busbar having a reception opening receiving the collar section, and a fastener inserted into the lead-through opening. The contact element has a first friction surface affixable with the busbar in the reception opening in a frictionally engaging manner and a second friction surface affixable in the reception opening with the busbar or in the lead-through opening with the fastener in a frictionally engaging manner. The first friction surface and the second friction surface are mutually offset in a radial direction with respect to the lead-through opening.

BRIEF DESCRIPTION OF THE DRAWINGS

The invention will now be described by way of example with reference to the accompanying Figures, of which.

DETAILED DESCRIPTION OF THE EMBODIMENTS

Figure 1:
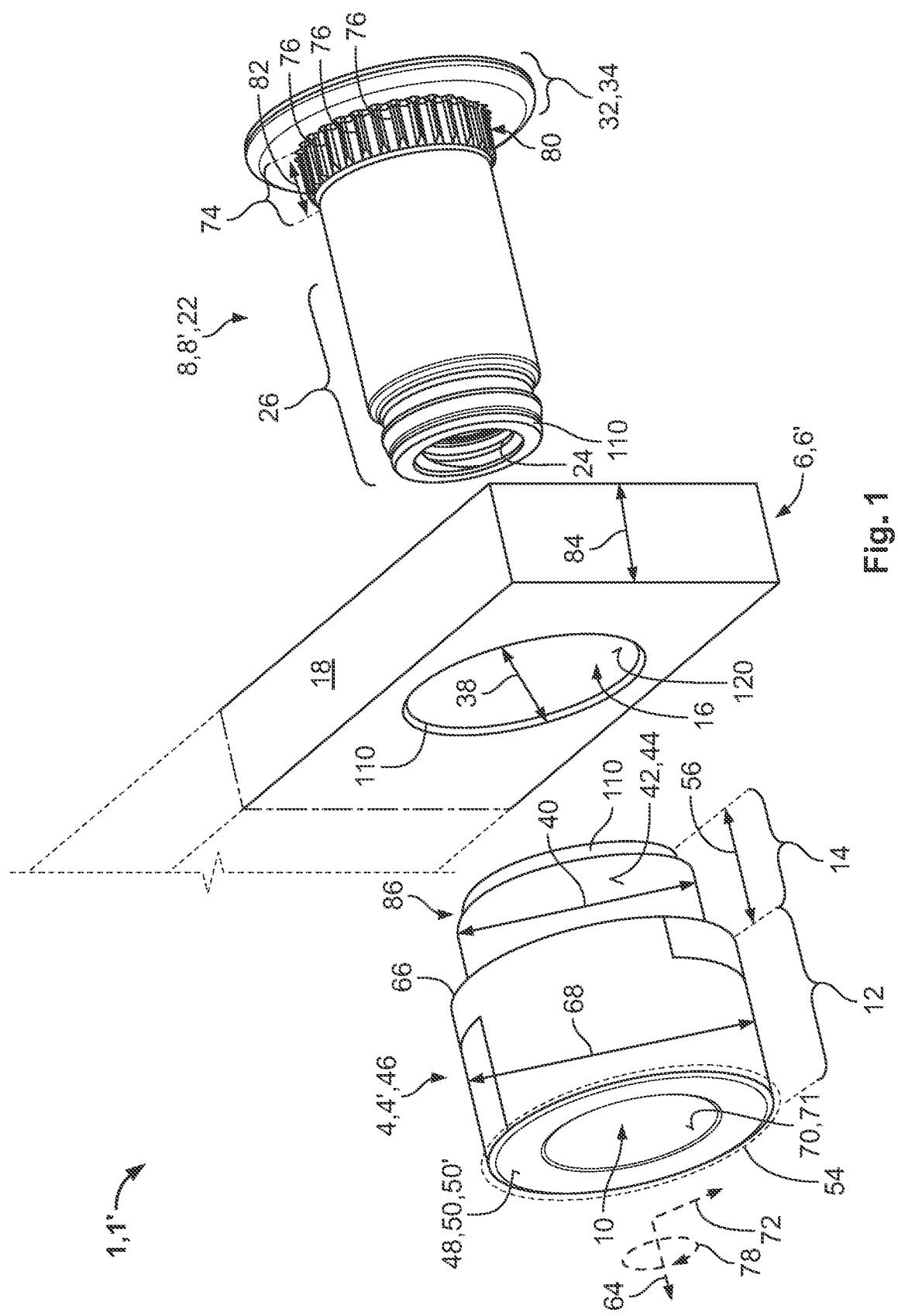
FIG. 1 is an exploded perspective view of a contact assembly according to an embodiment.

In the following, the invention is explained in more detail with reference to the drawings by several exemplary embodiments, the various features of which can be combined with one another as desired. In particular, individual features may be added to the described embodiments if the effect of these features is necessary for a particular application. Conversely, individual features can be omitted from the described embodiments if the technical effect of these features is not important in a specific application. In the drawings, similar, identical, and functionally identical elements are given identical reference signs where appropriate.

Based on the exemplary embodiments from FIGS. 1 to 5, the schematic structure of a contact assembly 1 according to the invention is described below. In addition, the schematic structure of a connection assembly 2 according to the invention is briefly explained with reference to FIG. 6.

As shown in FIG. 1, the contact assembly 1 in the exemplary embodiment comprises a contact element 4, a busbar 6 and a fastener 8. The contact element 4 and the busbar 6 may be provided as separate components (see FIG. 1) and, as will be explained in more detail below, may be frictionally mated together (see FIG. 2).

The contact element 4 may be fully coated with a nickel- and/or silver-containing coating. The contact element 4 can be fully coated because the contact element 4 is provided as a separate component before being affixed to the busbar 6 and does not have to withstand thermal stress by welding processes. A complete coating can be achieved, for example, by an electroplating dipping process, which eliminates the need for time-consuming sealing and bonding steps that would be necessary in a selective coating process for busbars 6 manufactured in one piece or welded together.

The contact element 4 comprises a lead-through opening 10 for inserting the fastener 8. Along the lead-through opening 10, a contact section 12 of the contact element 4 extends in a tube-shaped manner. A collar section 14 of the contact element 4 adjoins the contact section 12 and extends the lead-through opening 10 in a sleeve-shaped manner.

The busbar 6 has a reception opening 16 for receiving at least the collar section 14. The reception opening 16 is located, for example, in an end section 18 of the busbar 6. The busbar 6 can be both a busbar that runs between at least two electrical modules and a busbar segment that is part of an electrical module. The busbar segment may be electrically conductively connected to an electrode or an electrical pole of the electrical module and thus forms a connection of the electrical module.

Figure 2:
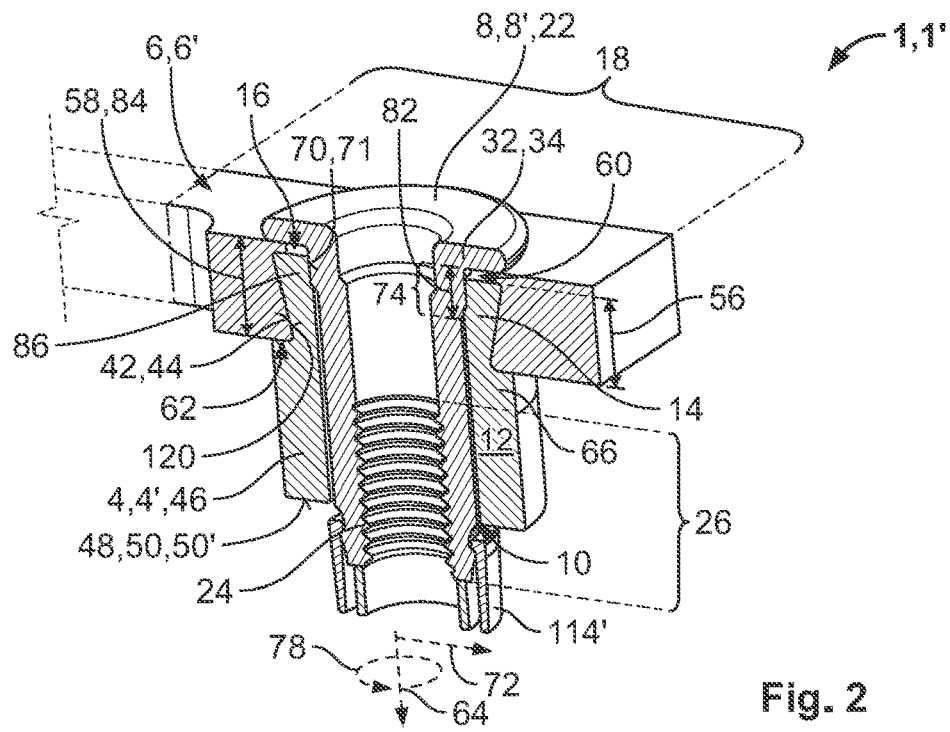
FIG. 2 is a sectional perspective view of the contact assembly of FIG. 1.
Figure 3:
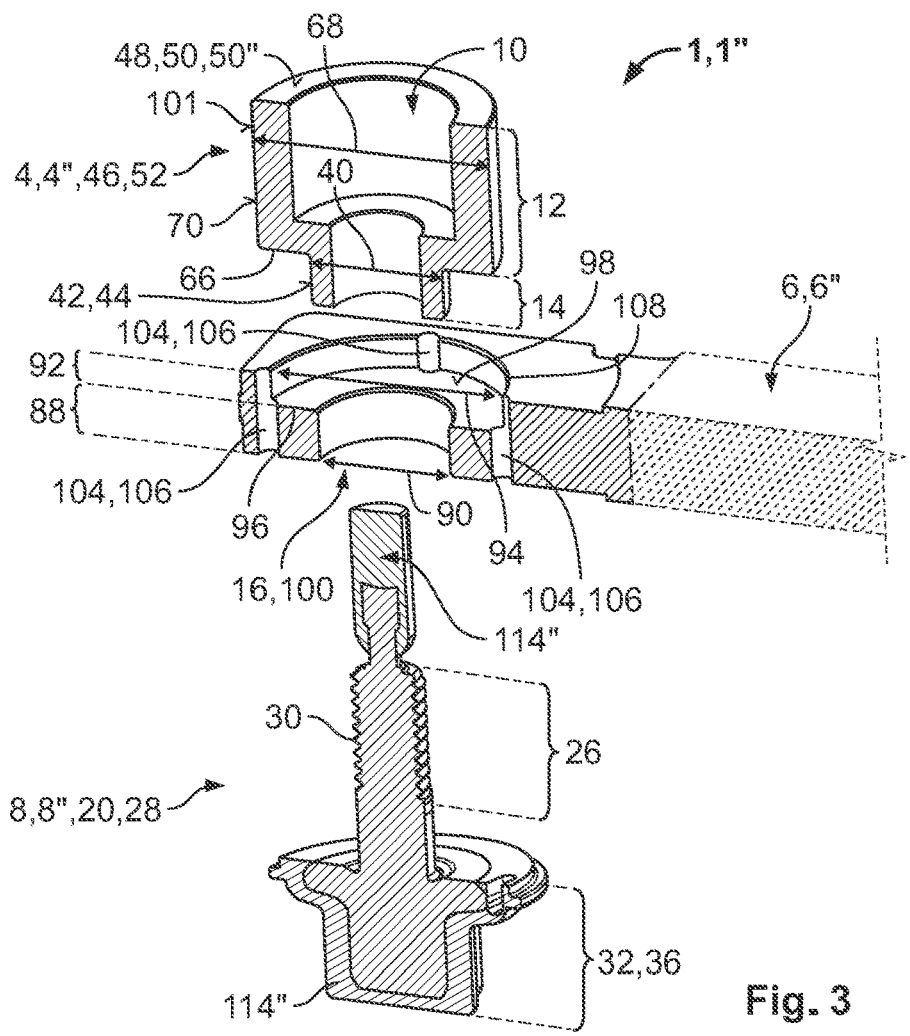
FIG. 3 is an exploded sectional perspective view of a contact assembly according to another embodiment.

The fastener 8 is used to detachably fasten the contact assembly 1 to a counterpart 20 that is complementary to the fastener 8, as shown in FIG. 3. The fastener 8 can also be frictionally mated to the contact element 4, as shown in FIG. 2, or freely rotatably arranged in the lead-through opening 10 of the contact element 4.

Figure 4:
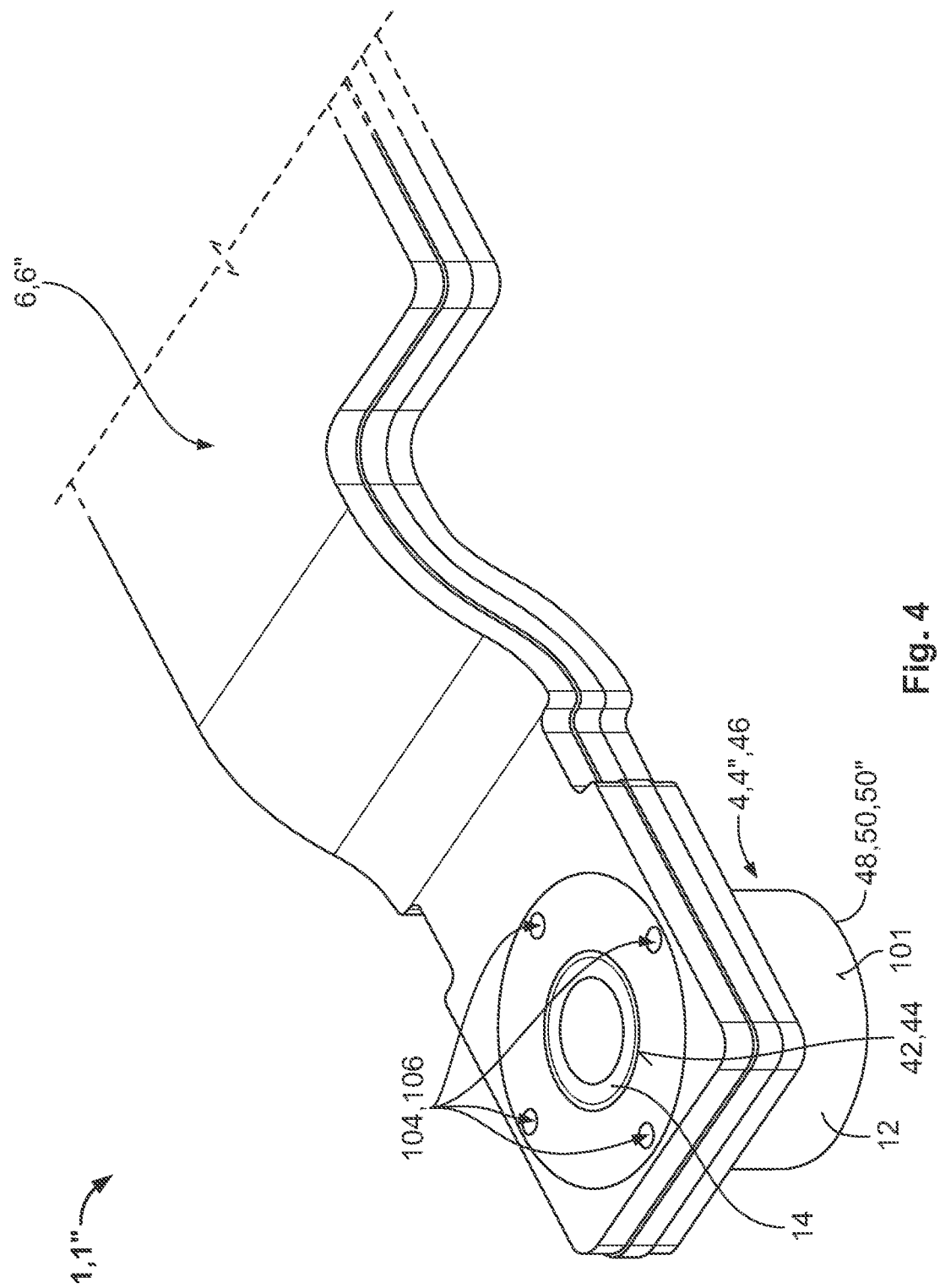
FIG. 4 is a perspective view of a rear side of the contact assembly of FIG. 3.
Figure 5:
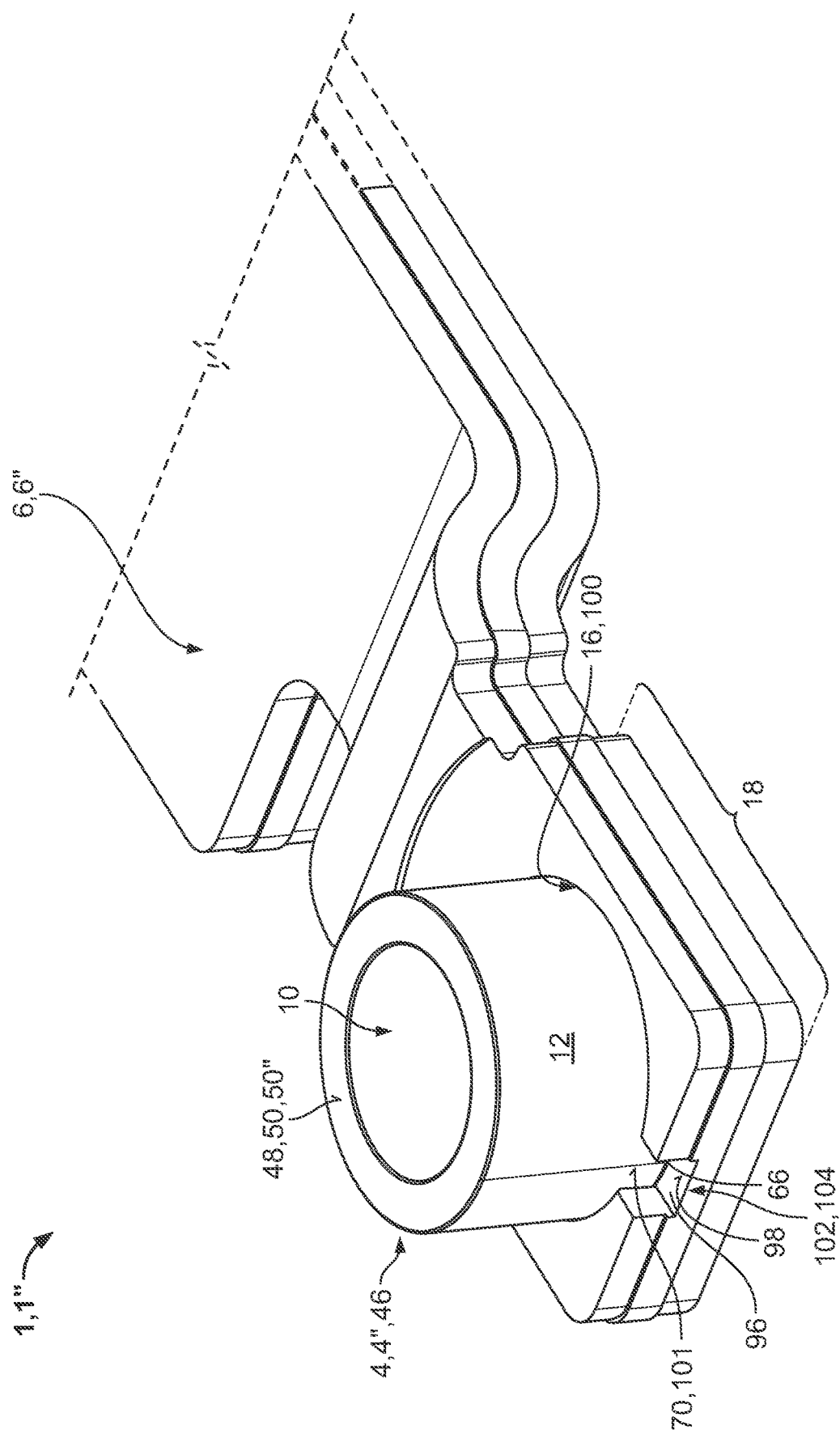
FIG. 5 is a perspective view of a contact assembly according to another embodiment.

In the exemplary embodiment shown in FIGS. 1 and 2, the fastener 8 of the contact assembly 1 is configured as a threaded sleeve 22 with an internal thread 24. The internal thread 24 is located on a threaded section 26 of the fastener 8. In FIG. 3, the fastener 8 is shown as a screw 28 with an external thread 30 on the threaded section 26. In FIGS. 4 and 5, the contact assembly 1 is shown without the fastener in each case.

In all the embodiments shown, the fastener 8 has a radially outwardly extending support section 32, wherein the support section 32 projects circumferentially in a plate-shaped manner from the remainder of the fastener 8. In the case of the fastener 8 in FIGS. 1 and 2, which is configured as a threaded sleeve 22, the support section 32 is formed by an annular widening 34. The fastener 8 of FIG. 3, configured as a screw 28, has a screw head 36 forming the support section 32. In the assembled state of the contact assembly 1, the support section 32 lies opposite the contact section 12 of the contact element 4 with respect to the busbar 6 (see FIG. 2). Furthermore, the support section 32 lies on the busbar 6 with respect to the threaded section 26 on its outer side when the threaded section 26 of the fastener 8 is inserted into the through-opening 10 of the contact element 4 received in the reception opening 16 of the busbar 6.

The reception opening 16 can have a continuously constant inner diameter 38 along its depth, as shown in FIG. 1, wherein an outer diameter 40 of the collar section 14 is oversized with respect to this constant inner diameter 38. In particular, the contact element 4 is frictionally affixable to the busbar 6 at a first friction surface 42 in the reception opening 16. The first friction surface 42 is arranged on an outer surface 44 of the collar section 14. In FIG. 2, the contact element 4 is frictionally fixed to the busbar 6 by the first friction surface 42 and is thus shown in a state joined to the busbar 6. In the exemplary embodiment shown, the contact element 4 is configured as a cylindrical contact ring 46, which is frictionally inserted with the collar section 14 into the reception opening 16 of the busbar 6. On an end face 48 of the contact section 12 facing away from the collar section 14, the contact element 4 has a contact surface 50 for a counter contact 52, shown in FIG. 3.

The contact ring 46 shown in FIG. 1 has a round cross-section 54 in axial direction 64 with respect to the lead-through opening 10. This simplifies the insertion process, since the contact element 4 can be inserted in any rotational position relative to the busbar 6. Alternatively, the contact ring 46 can also have a non-circular cross-section, in particular an oval, elliptical, square, rectangular or polygonal cross-section, at least locally, e.g. at the collar section 14, in order to prevent unintentional twisting of the contact element 4.

FIG. 2 shows that the collar section 14 is shorter than the reception opening 16 of the busbar 6. That is, a height 56 of the collar section 14 measured with respect to the lead-through opening 10 in the axial direction 64 is smaller than the length 58 of the reception opening 16. In order to compensate for thermal expansion processes, an annular gap 60 is provided between the collar section 14 of the contact element 4 and the support section 32 of the fastener 8 in the assembled state of the contact assembly 1.

The busbar 6 can be clamped thanks to the gap 60. In the event that the busbar 6 expands more thermally than the contact element 4 and the fastener 8, the frictional connection between the busbar 6 and the contact element 4 would cancel out, especially since the increase in the outer diameter of the collar section 14 could not compensate for the increase in the inner diameter of the reception opening 16. The oversize of the outer diameter relative to the inner diameter required for the frictional connection would no longer exist above a certain thermal expansion. Fixation and contacting of the contact element 4 to the busbar 6 would nevertheless continue, since the thermal expansion of the busbar 6 would also inevitably lead to an increase in said clamping.

Alternatively, the collar section 14 can also be configured to be the same length as the reception opening 16 of the busbar 6. This means that in the joined state, the collar section 14 is flush with the busbar 6, as shown in FIG. 4, and provides the greatest possible support surface for the support section 32 of the fastener 8 together with the busbar 6. This embodiment is particularly suitable for applications with low thermal loads or when the busbar 6 and the contact element 4 are made of the same material or at least have similar thermal expansion coefficients, so that the flush fit between the busbar 6 and the collar section 14 is not disturbed by thermal expansion of the components.

FIG. 2 also shows that the contact element 4 and the busbar 6 additionally form a form fit 62 in the axial direction 64 on at least one side. For this purpose, the contact element 4 has a circumferential shoulder 66 between the contact section 12 and the collar section 14, with which the contact element 4 abuts against the busbar 6. The contact section 12 has a larger outer diameter 68 than the collar section 14, as shown in FIG. 1, with the shoulder 66 forming a shoulder-like transition between the contact section 12 and the collar section 14. The busbar 6 can thus be clamped between the contact element 4 and the fastener 8, in particular between the shoulder 66 and the support section 32.

The contact element 4 of the contact assembly 1 shown in FIG. 1 is frictionally affixable to the fastener 8 at a second friction surface 70 in the lead-through opening 10, i.e., at an inner surface 71 of the contact element 4. The first friction surface 42 and the second friction surface 70 are offset from each other with respect to the lead-through opening 10 in the radial direction 72. FIG. 2 shows the contact element 4 in a frictionally fixed state with the second friction surface 70 on the fastener 8. In particular, the contact element 4 and the fastener 8 are fixed to each other in a rotationally fixed manner.

In the embodiment shown in FIGS. 1 and 2, the frictional connection between the contact element 4 and the fastener 8 is reinforced by a knurled section 74 on the fastener 8. This knurled section 74 has an oversize with respect to the lead-through opening 10 of the contact element 4. In the exemplary embodiment shown, the knurled section 74 has ribs 76 that protrude radially, extend axially, and are distributed over the knurled section 74 in the circumferential direction 78. In particular, the knurled section 74 here has serrations 80 parallel to the axis. The oversize of the knurled section 74 is selected such that the collar section 14 is plastically deformed by the knurled section 74 after insertion of the fastener 8 into the lead-through opening 10. This deformation affects the outer surface 44 of the collar section 14, shown in FIG. 2, and thus also strengthens the frictional connection between the contact element 4 and the busbar 6.

The knurled section 74 may be produced by knurling a rotationally symmetrical section of the fastener 8, however it is not limited to round cross-sections, but may also be produced in non-circular cross-sections, in particular oval, elliptical, square, rectangular or polygonal cross-sections, by other forming processes (e.g. stamping), by machining processes (e.g. milling) and/or by primary forming processes (e.g. casting), in which a surface structure as in knurling is obtained.

As shown in FIG. 2, the knurled section 74 is shorter than the reception opening 16 of the busbar 6. That is, a knurled length 82 measured in the axial direction 64 is smaller than the material thickness 84 of the busbar 6 surrounding the reception opening 16. Furthermore, the knurled section 74 is also shorter than the collar section 14 of the contact element 4, however the knurled section 74 and collar section 14 are in total longer than the reception opening 16. When inserting the contact element 4 and the fastener 8 into the reception opening 16 from opposite sides of the busbar 6, this ensures that the knurled section 74 extends as far as the collar section 14. An area 86 of the collar section 14 facing away from the contact section 12 is thereby widened in a conical shape and expands in a dowel-like manner in the reception opening 16 (see FIG. 2). In this way, a form fit is created between an inner surface 120 of the reception opening 16 and the deformed area 86 of the collar section 14.

The contact element 4 of the contact assembly 1 shown in FIG. 3 is configured to be affixed to the busbar 6 by the second friction surface 70 instead of to the fastener 8. Both the first friction surface 42 and the second friction surface 70 provide a frictional connection between the contact element 4 and the busbar 6. For this purpose, the reception opening 16 of the busbar 6 has two different inner diameters 90, 94 along its depth. In particular, the reception opening 16 has a narrower area 88 with a smaller inner diameter 90 and a wider area 92 with a larger inner diameter 94. The outer diameter 40 of the collar section 14 has an oversize with respect to the inner diameter 90 of the narrower area 88, while the outer diameter 68 of the contact section 12 has an oversize with respect to the inner diameter 94 of the wider area 92.

In the reception opening 16, the busbar 6 has a step 96 between the narrower area 88 and the wider area 92. The shoulder 66 of the contact element 4 can rest flat on this step 96, as shown in FIG. 5. A step surface 98 of the step 96 facing the wider area 92 forms here the transition between the smaller inner diameter 90 and the larger inner diameter 94. The reception opening 16 is configured as a correspondingly dimensioned stepped bore 100.

As shown in FIG. 5, in this embodiment, in addition to the collar section 14, at least a portion of the contact section 12 may also be received in the reception opening 16 of the busbar 6, wherein the second friction surface 70 is offset from the first friction surface 42 in the axial direction 64 and is formed by an outer surface 101 of the contact section 12. This creates an increased contact area between the contact element 4 and the busbar 6, which provides a large conductor cross-section for current transmission.

By a material recess 104 configured as a radial notch 102, shown in FIG. 5, it can be verified that the shoulder 66 of the contact element 4 actually extends to the step surface 98. In addition, the material recess 104 makes the end section 18 of the busbar 6 more easily deformable, so that mating of the contact element 4 and the busbar 6 is possible with less force.

As an alternative to the notch 102, an axial fine bore 106 can also form the material recess 104. This can be seen in FIGS. 3 and 4, where several axial fine bores 106 are distributed around the circumference 108 of the wider area 92 of the stepped bore 100. The axial fine bore 106 may be produced before the stepped bore 100, whereas the radial notch 102 can be milled after the stepped bore 100 has been produced.

In order to facilitate mutual insertion, the contact element 4, the busbar 6 and/or the fastener 8 may have insertion bevels 110, as shown in FIG. 1.

Figure 6:
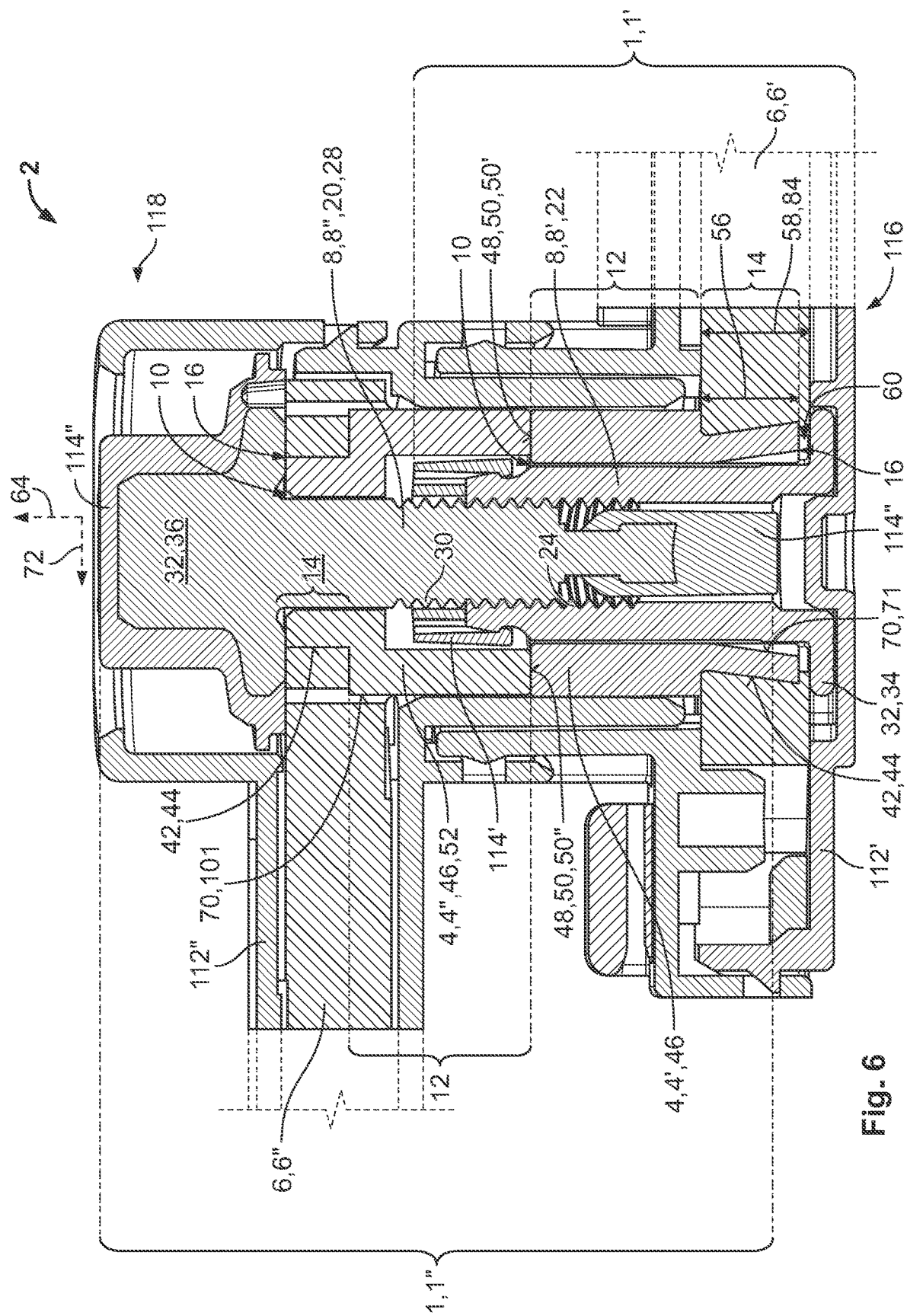
FIG. 6 is a sectional view of a connection assembly according to an embodiment.

The contact assembly 1' of FIG. 2 and the contact assembly 1" of FIG. 3 together form the connection assembly 2 of FIG. 6. In particular, the fastener 8' of the contact assembly 1' is configured complementary to the fastener 8" of the contact assembly 1". In other words, the fastener 8" represents the counterpart 20 to the fastener 8' and vice versa. For this purpose, the fastener 8' has the internal thread 24 and the fastener 8" has the corresponding counter thread as external thread 30. The contact surfaces 50', 50" of the contact elements 4', 4" are in face-to-face contact and are pressed together by the fasteners 8', 8". The use of a screw connection allows an axial force to be applied which presses the contact surface 50', 50" together. The resulting surface pressure on the contact surfaces 50', 50" increases the contact force and consequently reduces the contact resistance.

Furthermore, the connection assembly 2 has a respective contact protection housing 112', 112" for the contact assemblies 1', 1". As part of the respective contact protection housings 112', 112", the fasteners 8', 8" have contact protection caps 114', 114". The contact protection housing 112, 112" may be made of an electrically insulating material. The at least one contact protection cap 114', 114" can, for example, surround the support section 32 of the fastener 8. Alternatively or additionally, a further contact protection cap 114', 114" may be attached to the threaded section 26 of the fastener 8. The lead-through opening 10 of the contact element 4 can be configured, at least in sections, to accommodate the counterpart that is complementary to the fastener 8, in particular its contact protection cap 114', 114".

According to the invention, the contact assembly 1' shown in FIG. 6 can represent a battery terminal 116 of a battery cell, wherein the busbar 6' is electrically conductively connected to an electrode of the battery cell. The contact assembly 1" shown in FIG. 6, together with the contact protection housing 112", may also represent a module connector 118 according to the invention. Together with the battery cell just mentioned, the module connector 118 can form a battery module which can be connected to further battery modules and/or electrical consumer units via the busbars 6', 6".

A method of assembling the contact assembly 1 comprises the steps of providing the contact element 4, the busbar 6, and the fastener 8, frictionally locking the contact element 4 to the first friction surface 42 with the busbar 6, and frictionally locking the contact element 4 to the second friction surface 70 with the busbar 6 or with the fastener 8. In particular, the last two method steps of frictional fixing can be performed successively or simultaneously. An assembling machine which is configured to carry out the above method automatically, in particular fully automatically, also solves the underlying problem introductorily mentioned.

The busbar 6 can be manufactured completely independently of the contact element 4, having a complex course, and then mated to the contact element 4. Thanks to the fixability via the first friction surface 42, no welding together is necessary, so that the contact element 4 and the busbar 6 can be manufactured from materials that would otherwise be impossible or very difficult to weld. The second friction surface 70, which is radially offset from the first friction surface 42, also advantageously serves to provide fixability.

In summary, this means that in the contact assembly 1 according to the invention, the geometric structure as well as the choice of materials is not restricted, or at least is less restricted compared to the busbars 6 manufactured in one piece or welded together. Thus, a generally improved manufacturability is achieved.

What is claimed is:

1. A contact assembly, comprising:
    a contact element having a lead-through opening, a contact section extending in a tube-shaped manner along the lead-through opening and having a contact surface, and a collar section connected to the contact section and extending the lead-through opening in a sleeve-shaped manner;
    a busbar having a reception opening receiving the collar section; and
    a fastener inserted into the lead-through opening, the contact element has a first friction surface affixable with the busbar in the reception opening in a frictionally engaging manner and a second friction surface affixable in the reception opening with the busbar or in the lead-through opening with the fastener in a frictionally engaging manner, the first friction surface and the second friction surface are mutually offset in a radial direction with respect to the lead-through opening.

2. The contact assembly of claim 1, wherein the fastener fastens the contact assembly to a counterpart complementary to the fastener.

3. The contact assembly of claim 1, wherein the contact surface of the contact section contacts a counter contact.

4. The contact assembly of claim 1, wherein the contact element has a shoulder between the contact section and the collar section.

5. The contact assembly of claim 4, wherein the contact element abuts the busbar with the shoulder.

6. The contact assembly of claim 1, wherein the fastener has a threaded section and is a screw with an external thread on the threaded section.

7. The contact assembly of claim 1, wherein the fastener has a threaded section and is a threaded sleeve with an internal thread on the threaded section.

8. The contact assembly of claim 1, wherein the fastener has a support section extending radially outward, the support section rests on the busbar.

9. The contact assembly of claim 1, wherein the collar section is shorter than the reception opening.

10. The contact assembly of claim 1, wherein the fastener has a knurled section and the collar section is deformed by the knurled section after insertion of the fastener into the lead-through opening.

11. The contact assembly of claim 10, wherein the knurled section is shorter than the reception opening.

12. The contact assembly of claim 1, wherein the fastener is rotatably arranged in the lead-through opening.

13. The contact assembly of claim 1, wherein the reception opening is a stepped bore.

14. The contact assembly of claim 1, wherein the reception opening has a material recess on a circumference of the reception opening.

15. The contact assembly of claim 1, wherein the first friction surface is formed on an outer surface of the contact element.

16. The contact assembly of claim 15, wherein the second friction surface is formed on the outer surface of the contact element or on an inner surface of the contact element.

17. A module connector, comprising:
    a contact assembly according to claim 1; and
    a contact protection housing receiving the contact assembly.

18. A connection assembly, comprising:
    a first contact assembly according to claim 1; and
    a second contact assembly according to claim 1, the fastener of the first contact assembly is complementary to the fastener of the second contact assembly.

19. A battery cell, comprising:
    an electrode; and
    a battery connection configured as a contact assembly according to claim 1, the busbar of the contact assembly is electrically conductively connected to the electrode.

20. A battery module, comprising:
    a battery cell including an electrode and a battery connection; and
    a module connector including a contact assembly according to claim 1, a fastener of the battery connection is complementary to the fastener of the contact assembly of the module connector.

* * * * *